(12) United States Patent
Takeuchi

(10) Patent No.: US 6,502,122 B1
(45) Date of Patent: Dec. 31, 2002

(54) METHOD AND APPARATUS FOR EXECUTING TRANSACTION PROGRAMS IN PARALLEL

(75) Inventor: Hideki Takeuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/146,239

(22) Filed: Sep. 3, 1998

(30) Foreign Application Priority Data

Sep. 4, 1997 (JP) .............................................. 9-239793

(51) Int. Cl.[7] .................................................. G06F 9/00
(52) U.S. Cl. ........................................ 709/101; 714/16
(58) Field of Search ................................ 709/101, 104, 709/107; 714/16, 20, 21, 38

(56) References Cited

U.S. PATENT DOCUMENTS 5,754,854 A * 5/1998 Kanamori et al. .......... 395/674

FOREIGN PATENT DOCUMENTS

| JP | 6229442 | 10/1987 |
| JP | 1-314336 | 12/1989 |
| JP | 2-211546 | 8/1990 |
| JP | 7-36754 | 2/1995 |
| JP | 7-191863 | 7/1995 |
| JP | 8-235047 | 9/1996 |

OTHER PUBLICATIONS

David J. Taylor and Michael I. Wright, Backward Error Recovery in a Unix Environment, 1986, IEEE, 118–123.*

* cited by examiner

*Primary Examiner*—Alvin Oberly
*Assistant Examiner*—The T. Ho
(74) *Attorney, Agent, or Firm*—Sughrue Mion, PLLC

(57) ABSTRACT

The method of the present invention comprises the steps of: provisionally updating a resource through a first transaction program and locking the resource; determining if a second transaction program generates a request to update the resource which has been locked because of the provisional update through the first transaction program; making the second transaction program exclusively wait and reproducing a third transaction program having an internal status identical to that of the second transaction program when the second transaction program generates the update request; providing a virtual resource having an original status before the provisional update through the first transaction program; provisionally updating the virtual resource through the third transaction program without exclusive wait; and rolling back and closing the exclusively waiting second transaction program and executing commit in the reproduced third transaction program when rollback of the first transaction program is executed due to an abnormal situation detected in the first transaction program.

15 Claims, 2 Drawing Sheets

METHOD AND APPARATUS FOR EXECUTING TRANSACTION PROGRAMS IN PARALLEL

FIELD OF THE INVENTION

The present invention relates to a method and an apparatus for executing a plurality of transaction programs in parallel, and in particular to a method and an apparatus applicable to a computer in which multiple access to a shared resource occurs simultaneously in transaction programs.

This application is based on Japanese Patent Application No. Hei 9-239793, the contents of which are incorporated herein by reference.

BACKGROUND ART

In a conventional computer system in which multiple access to an identical resource occurs through transaction programs, a second transaction program to update the resource is kept waiting exclusively until the update of the resource through the first transaction program is completed (commit or rollback) when the resource is being provisionally updated through a first transaction program, thus avoiding conflict in the resource.

Japanese Patent Application, First Publication No. Hei 8-235047 discloses a method for improving a process efficiency in transaction programs. According to the disclosure, when access to an identical resource occurs through first and second transaction programs, a second transaction program does not wait, and a completion step (commit or rollback) in a first transaction program is arranged to correspond to a completion step in the second transaction program, thereby improving the performance in execution of the transaction programs.

However, in the conventional method described above, the transaction programs cannot be executed in parallel and the process efficiency cannot be improved in the conventional computer system in which multiple access to an identical resource occurs through transaction programs, because when the resource is being provisionally updated through a first transaction program, a second transaction program to update the resource has been kept waiting exclusively until the update of the resource through the first transaction program is completed (commit or rollback) in order to avoid the conflict in the resource.

Further, in the method disclosed in Japanese Patent Application, First Publication No. Hei 8-235047, there is the problem in that when commit is normally executed in the first transaction program to access to the resource prior to the second transaction program, it is necessary to roll back and restart the second transaction program.

SUMMARY OF THE INVENTION

It is therefore an object of the present invention to provide a method and an apparatus which can improve a performance in transaction programs.

In order to accomplish the above object, a method for executing a plurality of transaction programs in parallel in a computer, comprises the steps of: provisionally updating a resource through a first transaction program and locking the resource; determining if a second transaction program generates a request to update the resource which has been locked because of the provisional update through the first transaction program: making the second transaction program exclusively waiting and reproducing a third transaction program having an internal status identical to that of the second transaction program when the second transaction program generates the update request; providing a virtual resource having an original status before the provisional update through the first transaction program; provisionally updating the virtual resource through the third transaction program without exclusive wait; and rolling back and closing the exclusively waiting second transaction program and executing commit in the reproduced third transaction program when rollback of the first transaction program is executed due to an abnormal situation detected in the first transaction program.

In another aspect of the present invention, the method further comprises the step of: resuming the exclusively waiting second transaction program and rolling back and closing the reproduced third transaction program when commit is normally executed in the first transaction program. Executable units of the first transaction program and the second transaction program are jobs, processes, tasks, or threads.

Further, an apparatus of the present invention comprises: a means for provisionally updating a resource through a first transaction program and locking the resource; a means for determining if a second transaction program generates a request to update the resource which has been locked because of the provisional update through the first transaction program: a means for making the second transaction program exclusively wait; a means for reproducing a third transaction program having an internal status identical to that of the second transaction program when the second transaction program generates the update request; a means for providing a virtual resource having an original status before the provisional update through the first transaction program; a means for provisionally updating the virtual resource through the third transaction program without exclusive wait; and a means for rolling back and closing the exclusively waiting second transaction program and executing commit in the reproduced third transaction program when rollback of the first transaction program is executed due to an abnormal situation detected in the first transaction program.

According to the present invention, a computer-readable medium contains program instructions for performing the steps of: provisionally updating a resource through a first transaction program and locking the resource; determining if a second transaction program generates a request to update the resource which has been locked because of the provisional update through the first transaction program; making the second transaction program exclusively wait and reproducing a third transaction program having an internal status identical to that of the second transaction program when the second transaction program generates the update request; providing a virtual resource having an original status before the provisional update through the first transaction program; provisionally updating the virtual resource through the third transaction program without exclusive wait; and rolling back and closing the exclusively waiting second transaction program and executing commit in the reproduced third transaction program when rollback of the first transaction program is executed due to an abnormal situation detected in the first transaction program.

According to the present invention, the reproduced transaction program is executed in parallel, and a post-process after release from a exclusive wait status is carried out in advance, thereby shortening a time required for execution of the transaction program and enhancing the performance in the transaction program.

DETAILED DESCRIPTION OF THE PREFERRED EMBODIMENTS

Figure 1:
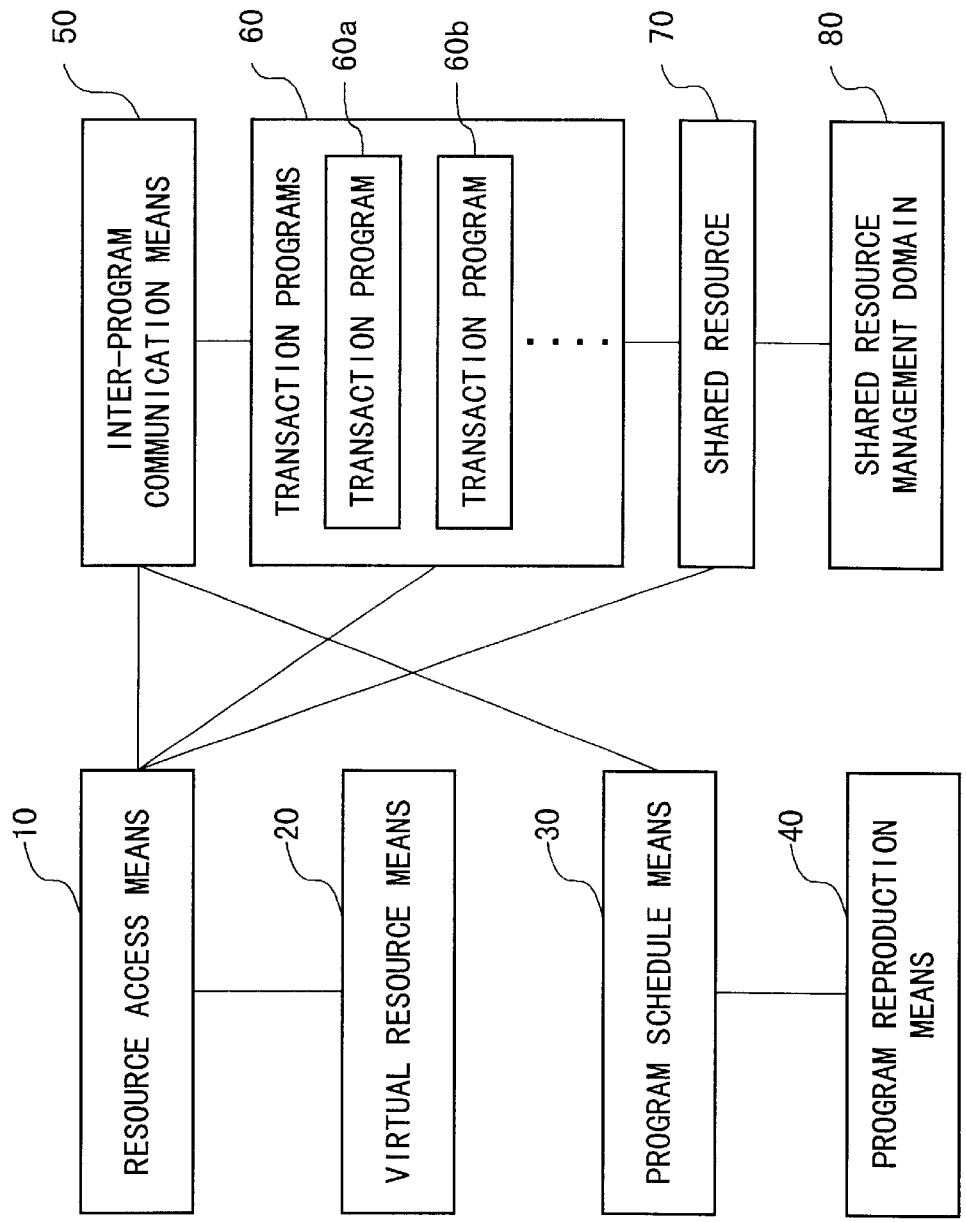
FIG. 1 is a block diagram showing a basic construction of the embodiment of the present invention.
Figure 2:
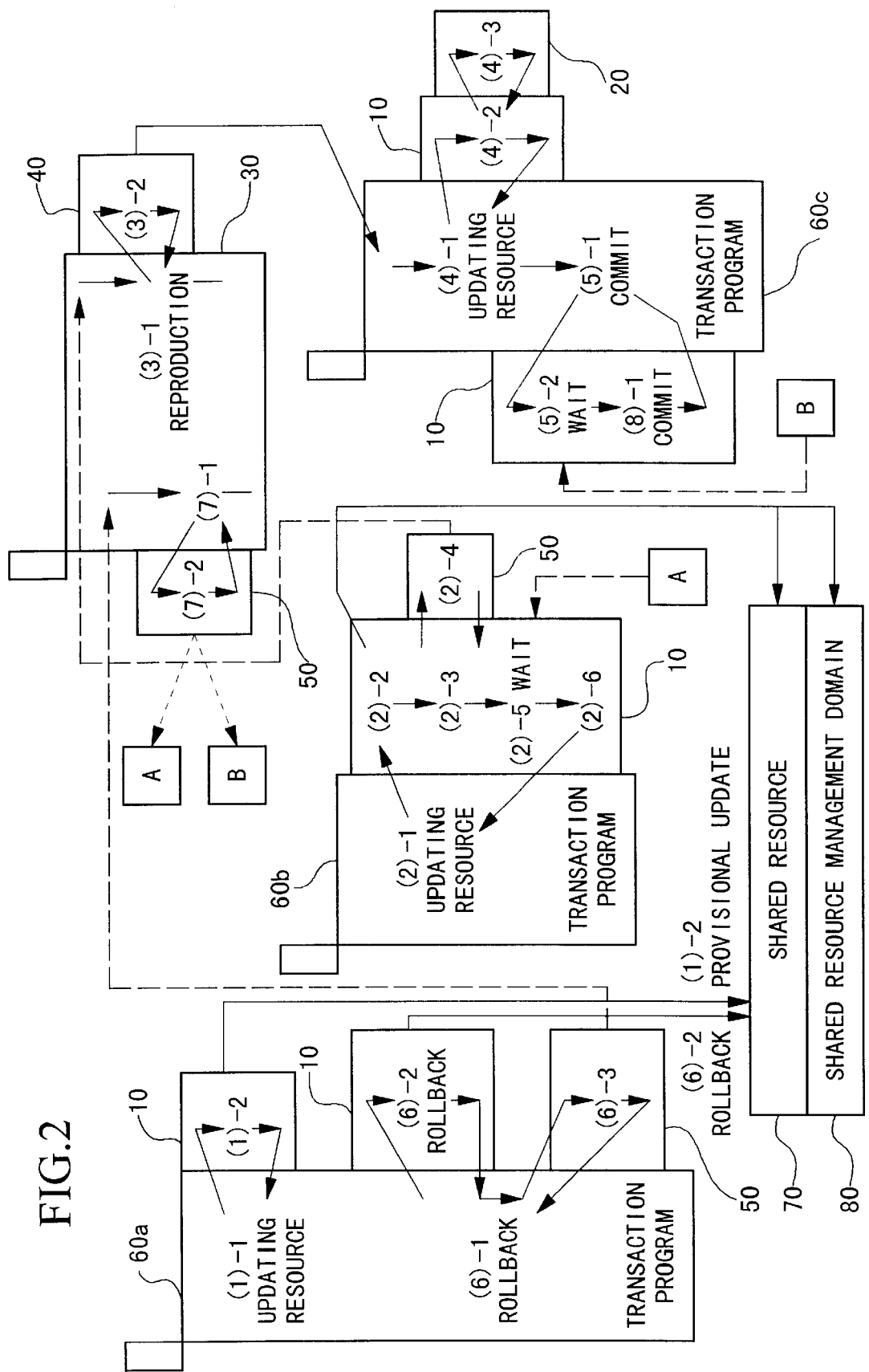
FIG. 2 is a diagram showing an operation of the present invention when a transaction program is rolled back during its processing after update of a shared resource.

Referring to FIGS. 1 and 2, a preferred embodiment of the present invention, will be explained.

FIG. 1 is a block diagram showing a basic construction of the embodiment of the present invention. The system is comprised of a resource access means 10, a virtual resource means 20, a program schedule means 30, a program reproduction means 40, an inter-program communication means 50, transaction programs 60, a shared resource 70, and a shared resource management domain 80.

The resource access means 10 includes a means for performing a read operation to the resource for the transaction programs 60, a means for performing a write operation to the resource, a means for committing the resource, and a means for rolling back the resource.

The virtual resource means 20, utilized by the transaction programs 60 via the resource access means 10, includes a means for providing a virtual resource having an original status of the shared resource 70 before provisional update through the transaction program 60a (a means for allowing the transaction program 60b to access to the resource without exclusive-wait).

The program schedule means 30, utilized by the transaction programs 60 via the inter-program communication means 50, notifies the other transaction program 60b of the release of the resource in response to commit or rollback of a transaction program 60a. The program schedule means 30, utilized by the inter-program communication means 50 via the inter-program communication means 50, directs the program reproduction means 40 to reproduce a transaction program 60c which has an internal status identical to the exclusively waiting transaction program 60b when exclusive-wait occurs in the access to the shared resource 70 through the transaction program 60.

The program reproduction means 40, utilized by the program schedule means 30, reproduces a transaction program 60c which has an internal status identical to that of the specified transaction program 60b. The inter-program communication means 50 establishes communication between the transaction programs 60 and the program schedule means 30. The shared resource management domain 80 manages the status of the shared resource 70.

Referring to FIG. 2, an operation when the transaction program is rolled back during its processing after an update of the shared resource will be explained.

The shared resource 70 is updated through the transaction program 60a using the resource access means 10 (at step (1)-1). Subsequently, the transaction program 60b generates a request to update the shared resource 70 using the resource access means 10 (at step (2)-1). The resource access means 10 refers to the shared resource management domain 80 (at step (2)-2), and updating of the shared resource 70 through the transaction program 60a (at step (2)-3) is detected. Then, the program schedule means 30 is requested through the inter-program communication means 50 to reproduce the transaction program 60c (at step (2)-4), and the transaction program 60b remains waiting exclusively (at step (2)-5).

In response to the request, the program schedule means 30 directs the program reproduction means 40 to reproduce the transaction program 60c which has an internal status identical to that of the transaction program 60b (at step (3)-1), and controls the schedule (at step (3)-2).

The resource is updated in the reproduced transaction program 60c (at step (4)-1) while the transaction program 60b remains exclusively waiting at step (2)-5. That is, the resource access means 10 virtually updates the shared resource 70 (at step (4)-3) using the virtual resource means 20 (at step (4)-2).

When trying to execute commit (at step (5)-1), the reproduced transaction program 60c exclusively waits along with the resource access means 10 (at step (5)-2).

When an uncommittable event is detected through the transaction program 60a (at step (6)-1), rollback of the transaction program 60a is executed by the resource access means 10 (at step (6)-2), and the inter-program communication means 50 notifies other transaction programs waiting for the release (at step (6)-3) that the shared resource 70 has been released.

The program schedule means 30 notifies the transaction programs 60b and 60c (at step (7)-2) that the shared resource 70 has been released, using the inter-program communication means 50 (at step (7)-1).

The transaction program 60b is released from the exclusive-wait status at step (2)-5 depending on notification of the release of the shared resource 70, and rollback is performed in the transaction program 60b (at step (2)-6).

The transaction program 60c is released from the exclusive wait status at step (5)-2 according to the notification as to release of the shared resource 70, and a commit process is performed in the transaction program 60c (at step (8)-1).

According to the series of processes, the processes equal to that of the transaction program 60b can be performed through the transaction program 60c without rollback and restart of the transaction program 60b.

Although in the above description the operation when the rollback is performed during the transaction program 60a is explained, the transaction program 60b resumes and the transaction program 60c is closed after rollback when the transaction program 60a is normally committed.

According to the architectures of computers (operating systems), a job, a process, a task, or a thread may be generally employed as a executable unit of a program. In the present invention, any one of these executable units may be reproduction units, and the executable subjects are not only specified transaction programs, but also internal processes in a database.

This invention may be embodied in other forms or carried out in other ways without departing from the spirit thereof. The present embodiments are therefore to be considered in all respects illustrative and not limiting, the scope of the invention being indicated by the appended claims, and all modifications falling within the meaning and range of equivalency are intended to be embraced therein.

What is claimed is:

1. A method for executing a plurality of transaction programs in parallel in a computer, comprising the steps of:

provisionally updating a resource through a first transaction program and locking said resource;

determining if a second transaction program generates a request to update said resource which has been locked because of the provisional update through said first transaction program:

making said second transaction program exclusively wait and reproducing a third transaction program having an internal status identical to that of said second transaction program when said second transaction program generates said update request;

providing a virtual resource having an original status before the provisional update through said first transaction program;

provisionally updating said virtual resource through said third transaction program without exclusive wait; and rolling back and closing said exclusively waiting second transaction program and executing commit in said reproduced third transaction program when rollback of said first transaction program is executed due to an abnormal situation detected in said first transaction program.

2. A method according to claim 1 further comprising the step of:

resuming said exclusively waiting second transaction program and rolling back and closing said reproduced third transaction program when commit is normally executed in said first transaction program.

3. A method according to claim 1, wherein executable units of said first transaction program and said second transaction program are jobs, processes, tasks, or threads.

4. An apparatus for executing transaction programs in parallel in a computer, comprising:

a means for provisionally updating a resource through a first transaction program and locking said resource;

a means for determining if a second transaction program generates a request to update said resource which has been locked because of the provisional update through said first transaction program:

a means for making said second transaction program exclusively wait;

a means for reproducing a third transaction program having an internal status identical to that of said second transaction program when said second transaction program generates said update request;

a means for providing a virtual resource having an original status before the provisional update through said first transaction program;

a means for provisionally updating said virtual resource through said third transaction program without exclusive wait; and a means for rolling back and closing said exclusively waiting second transaction program and executing commit in said reproduced third transaction program when rollback of said first transaction program is executed due to an abnormal situation detected in said first transaction program.

5. An apparatus according to claim 4 further comprising:

a means for resuming said exclusively waiting second transaction program and rolling back and closing said reproduced third transaction program when commit is normally executed in said first transaction program.

6. An apparatus according to claim 4, wherein executable units of said first transaction program and said second transaction program are jobs, processes, tasks, or threads.

7. A computer-readable medium containing program instructions for executing a plurality of transaction programs in parallel in a computer, said program instructions including instructions for performing the steps of:

provisionally updating a resource through a first transaction program and locking said resource;

determining if a second transaction program generates a request to update said resource which has been locked because of the provisional update through said first transaction program:

making said second transaction program exclusively wait and reproducing a third transaction program having an internal status identical to that of said second transaction program when said second transaction program generates said update request;

providing a virtual resource having an original status before the provisional update through said first transaction program;

provisionally updating said virtual resource through said third transaction program without exclusive wait; and rolling back and closing said exclusively waiting second transaction program and executing commit in said reproduced third transaction program when rollback of said first transaction program is executed due to an abnormal situation detected in said first transaction program.

8. A computer-readable medium according to claim 7, said program instructions including instructions for performing the step of resuming said exclusively waiting second transaction program and rolling back and closing said reproduced third transaction program when commit is normally executed in said first transaction program.

9. A computer-readable medium according to claim 7, wherein executable units of said first transaction program and said second transaction program are jobs, processes, tasks, or threads.

10. An apparatus for executing a plurality of transaction programs in a data processor, comprising:

(a) a program reproduction module connected to reproduce a requesting transaction program that has generated a request to access a blocked shared resource, and to generate a reproduced transaction program having an internal state substantially identical to that of said requesting transaction program;

(b) a virtual resource module adapted to provide to said reproduced transaction program a virtual shared resource updated by said reproduced transaction program without exclusive wait, said virtual shared resource having an internal state substantially identical to an original state of said shared resource, the original state being the state immediately before update by a first transaction program that has caused the shared resource to be blocked to said requesting transaction program;

(c) a resource access module adapted to transmit to a shared resource data from a transaction program, and adapted to rollback and close said requesting transaction program and executing commit in said reproduced transaction program, when rollback of the first transaction program is executed due to detection of an abnormal condition, wherein said apparatus for executing a plurality of transaction programs is adapted to execute transaction programs in parallel.

11. An apparatus according to claim 10, wherein executable units of said first transaction program, said requesting transaction program, or said reproduced transaction program are jobs, processes, tasks, or threads.

12. A computer readable medium containing program instructions configured to implement the apparatus for executing a plurality of transaction programs of claim 10.

13. A method for executing a plurality of transaction programs in a data processor, comprising:

(a) reproducing a requesting transaction program that has generated a request to access a blocked shared resource, and generating a reproduced transaction program having an internal state substantially identical to that of said requesting transaction program;

(b) updating by said reproduced transaction program without exclusive wait a virtual shared resource having an internal state substantially identical to an original state of said shared resource, the original state being the state immediately before update by a first transaction program that has caused the shared resource to be blocked to said requesting transaction program;

(c) accessing a resource to transmit to a shared resource data from a transaction program, and rolling back and closing said requesting transaction program and executing commit in said reproduced transaction program, when rollback of the first transaction program is executed due to detection of an abnormal condition, wherein said method for executing a plurality of transaction programs is adapted to execute transaction programs in parallel.

14. A method according to claim 13, wherein executable units of said first transaction program, said requesting transaction program, or said reproduced transaction program are jobs, processes, tasks, or threads.

15. A computer readable medium containing program instructions configured to perform the method for executing a plurality of transaction programs of claim 13.

* * * * *